3,445,456
NOVEL AZIRIDINE DERIVATIVES AND PRODUCTION THEREOF

Hiroshi Tanida, Osaka, and Teruji Tsuji, Takatsuki-shi, Japan, assignors to Shionogi & Co., Ltd., Osaka, Japan
No Drawing. Filed Oct. 27, 1965, Ser. No. 505,400
Claims priority, application Japan, Nov. 5, 1964, 39/62,796
Int. Cl. C07d *23/06, 55/02;* A61k *27/00*
U.S. Cl. 260—239  6 Claims

ABSTRACT OF THE DISCLOSURE

A compound from the group of compounds of the formula:

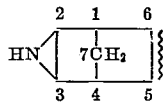

and the acid addition salts thereof, wherein the symbol ≀ represents hydrogen atoms at positions 5 and 6, a double bond between said positions or a condensed benzene ring with or without one or more substituents selected from the group consisting of lower alkyl group, lower alkoxy group, halogen, amino group, alkylamino group, di(lower)alkylamino group and cyano group between the 5- and 6-positions. The compounds are useful as anti-depressants and psychomotor stimulants.

---

The present invention relates to novel aziridine derivatives and production thereof. More particularly, the present invention relates to norbornenyl aziridine compounds useful as anti-depressants and psychomotor stimulants and to the production of the said norbornenyl aziridine compounds.

The said norbornenyl aziridine compounds are represented by the formula:

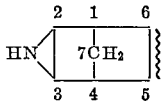

wherein the symbol ≀ represents hydrogen atoms at the 5- and 6-positions, a double bond between the 5- and 6-positions or a condensed benzene ring with or without one or more substituents between the 5- and 6-positions.

Accordingly, it is a basic object of the present invention to embody the norbornenyl aziridine compounds (I). Another object of this invention is to embody the norbornenyl aziridine compounds (I) useful as anti-depressants and psychomotor stimulants. A further object of the invention is to embody a process for preparing the norbornenyl aziridine compounds (I). These and other objects will be apparent to those conversant with the art to which the present invention pertains from the subsequent description.

The present invention comprises subjecting a norbornenyl compound represented by the formula:

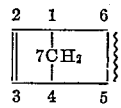

to addition of an azidoformate represented by the formula:

$$N_3COOR$$

wherein R represents a lower alkyl group, an aryl group or an ar(lower)alkyl group to give a triazoline compound represented by the formula:

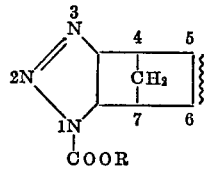

wherein R has the same significance as designated above and wherein the symbol ≀ has the previously indicated significance, decomposing the triazoline compound (III) to give a N-substituted aziridine compound represented by the formula:

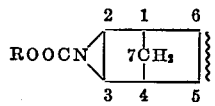

wherein R has the same significance as designated above and wherein the symbol ≀ has the previously indicated significance and eliminating the N-substituent from the N-substituted aziridine compound (IV) to give the corresponding aziridine compound (I).

The heretofore-known synthetic method for the production of this type of aziridine derivative involves irradiating an azide compound with ultra-violet light to give a nitrine, and thereafter treating the resultant nitrine with an olefine [W. Lwowski et al.: J.A.C.S., vol. 85, p. 1200, 1963]. When this method is applied to a norbornenyl compound, yield-impairing various side reactions tend to occur. The present inventors have found that an aziridine compound (I) can be prepared in a good yield by reacting the corresponding norbornenyl compound (II) with an azidoformate to give the triazoline compound (III), decomposing the triazoline compound (III) to give the N-substituted aziridine compound (IV) and thereafter eliminating the substituent at the N-position from the N-substituted aziridine compound. Since such a decomposition reaction of a thiazoline has heretofore been effected by heating the triazoline compound in a solvent of high boiling point, there have inevitably been involved various undesirable side reactions conducive to a poor yield [K. Adler et al.: Liebigs Ann. Chem., vol. 501, p. 1, 1933]. However, it has been found by the present inventors that an N-substituted aziridine compound can be obtained in a high yield by decomposing the triazoline compound in a low-boiling solvent.

Examples of starting materials employed in the present process are 2-norbornene, 2,5-norbornadiene and substituted or unsubstituted benzo[5,6]-2,5-norbornadiene. As substituents possibly present on the benzene ring, there are exemplified lower alkyl group (e.g. methyl, ethyl, propyl), lower alkoxy group (e.g. methoxy, ethoxy, propoxyl), halogen (e.g. chlorine, bromine, iodine), amino group, (lower)-alkylamino group (e.g. methylamino, ethylamino), di(lower)alkylamino group (e.g. dimethylamino, diethylamino) and cyano group.

The present process comprises three steps, that is, [A] reacting the starting material (II) with an azidoformate to give the triazoline compound (III), [B] decomposing the triazoline compound to give the N-substituted aziridine compound (IV) and [C] eliminating the substituent at the N-position from the N-substituted aziridine compound to give the objective arziridine compound (I).

A step.—According to the present process, the starting norbornenyl compound (II) is treated with an azidoformate such as lower alkyl azidoformate (e.g. methyl azidoformate, ethyl azidoformate, propyl azidoformate), aryl azidoformate (e.g. phenyl azidoformate, p-methoxyphenyl azidoformate, p-nitrophenyl azidoformate) or ar(lower)alkyl azidoformate (e.g. benzyl azidoformate, phenethyl azidoformate) in an inert solvent. As the inert solvent, there are exemplified hydrocarbons such as benzene, toluene, xylene, hexane or pentane, petroleum solvents such as petroleum ether or petroleum benzine, and halogenated hydrocarbon such as carbon tetrachloride. The present reaction proceeds smoothly under cooling or at room temperature. Since the azide compound is sensitive to light or heat and therefore a radical reaction may occur, the present reaction is favorably carried out in a cool and dark place. Thus, the triazoline compound (III) is prepared in a high yield.

B step.—Next, the triazoline compound (III) is treated with a lower alkanol such as methanol, ethanol or butanol at room temperature or under slight heating to give the N-substituted aziridine compound (IV) together with generation of nitrogen gas.

C step.—Further, the N-substituted aziridine compound (IV) is hydrolyzed for eliminating the substituent at the N-position to give the objective aziridine compound (I). As methods of hydrolysis, there are exemplified a method of treatment with alkali hydroxide such as sodium hydroxide or potassium hydroxide in per se conventional manner and a method of treatment with a metallic hydride complex such as lithium aluminum hydride and decomposing the produced metallic complex with water.

The thus-obtained aziridine derivatives (I) can be, when required, converted into acid addition salts such as acetate, oxalate, succinate, picrate, salicylate, carbonate or malate, etc. in per se conventional manner.

There may be produced steric isomers of the aziridine (i.e. endo type and exo type) in the objective substances, but these are all comprised in the present invention.

The objective aziridine compounds (I) are useful as anti-depressants and psychomotor stimulants. For instance, 2,3-exo-imino-benzo[5,6]-5-norbornene controls ptosis in rats induced by subcutaneous administration of 10 milligrams of reserpine per kilogram of body weight, when previously administered by subcutaneous route at a dose of 25 milligrams per kilogram of body weight. Further, the previous administration of 10 milligrams of the said compound per kilogram of body weight by intravenous route increases blood pressure elevation in urethan and phenobarbital sodium-anesthetized cats caused by intravenous administration of $10^{-2}$ milligrams of noradrenaline per kilogram of body weight. The previous administration of 50 milligrams of the said compound per kilogram of body weight by subcutaneous route increases spontaneous motor action moderately for 110 minutes. The previous administration of 25 milligrams of the said compound per kilogram of body weight by subcutaneous route potentiates narcosis for 6 minutes and 36 seconds in anesthetized mice caused by subcutaneous administration of 35 milligrams of thiopental sodium per kilogram of body weight in comparison with that of the control (thiopental sodium) for 3 minutes and 40 seconds. Furthermore, the said compound protects mice from tonic extensor induced by electroconvulsive shock, when given at the 50 percent effective dose ($ED_{50}$) 61.7 milligrams per kilogram of body weight. The acute toxicity ($LD_{50}$) of the said compound in mice is as follows: subcutaneous 578.4 milligrams per kilogram of body weight.

Presently preferred and practical embodiments of the present invention are illustratively shown by the following examples. In these examples, the relationship of parts by weight to parts by volume is the same as that between grams and milliliters. Temperatures are set forth in degrees centigrade.

EXAMPLE 1

(a) To pentane (50 parts by volume), there are added benzo[5,6]-2,5-norbornadiene (27.4 parts by weight) and ethyl azidoformate (20 parts by weight), and the resultant mixture is allowed to stand in a cool and dark place for a week. The precipitated crystals are collected by filtration, washed with pentane and the crude product (38.4 parts by weight) is recrystallized from ether to give 3a,4,9,9a-tetrahydro-1-carboethoxy-4,9-methanonaphtho[2,3 - d]triazole as cubic crystals melting at 94° C.

(b) A solution of 3a,4,9,9a-tetrahydro-1-carboethoxy-4,9-methanonaphtho[2,3-d]triazole (29.9 parts by weight) in anhydrous methanol is warmed at 40° C. to lead to vigorous bubble formation and decomposition. Warming is continued for about 2.5 hours and the methanol is evaporated under reduced pressure. The residue is distilled at 130° C./4 mm. Hg to give 2,3-exo-carboethoxyimino-benzo[5,6]-5-norbornene (25.2 parts by weight).

(c) A solution of 2,3-exo-carboethoxyimino-benzo[5,6]-5-norbornene (11.6 parts by weight) and potassium hydroxide (5.5 parts by weight) in ethanol (250 parts by volume) is refluxed for 4 hours. The solvent is evaporated under reduced pressure. The residue is combined with water and the mixture is shaken with ether. The ethereal layer is dried over potassium carbonate and the ether is evaporated to give 2,3-exo-imino-benzo[5,6]-5-norbornene (5.9 parts by weight) as crystals melting at 95 to 96° C.

EXAMPLE 2

(a) To pentane (200 parts by volume), there are added 2-norbornene (47.43 parts by weight) and ethyl azidoformate (43.5 parts by weight), and the resultant mixture is allowed to stand in a cool and dark place for a week. The reaction mixture is concentrated under reduced pressure at 50° C. to give 3a,4,5,6,7,7a-hexahydro-1-carboethoxy-4,7-methanobenzotriazole (75.66 parts by weight) as an oil.

(b) A solution of the above triazole (75.66 parts by weight) in anhydrous methanol is warmed at 39 to 41° C. to lead to vigorous bubbling and decomposition. Warming is continued for about 2.5 hours and the methanol is evaporated under reduced pressure. The residue is distilled at 75 to 76° C./3 mm. Hg to give 2,3-exo-carboethoxyimino-norbornane (56.7 parts by weight).

(c) A solution of 2,3-exo-carboethoxyimino-norbornane (6.30 parts by weight) and potassium hydroxide (3.91 parts by weight) in alcohol (200 parts by volume) is refluxed for 4 hours. The solvent is evaporated under reduced pressure. The residue is combined with water and the mixture is shaken with ether. The ethereal layer is dried over anhydrous potassium carbonate and the ether is evaporated. The residue is sublimed at 80° C./10 mm. Hg to give 2,3-exo-imino-norbornane. This substance is unstable and readily forms its carbonate in the atmosphere. Its oxalate melts at 138 to 139° C.

EXAMPLE 3

(a) To pentane (200 parts by volume), there are added 2,5-norbornadiene (115 parts by weight) and ethyl azidoformate (48.1 parts by weight) and the resultant mixture is allowed to stand for 4 days. The reaction mixture is concentrated under reduced pressure at 50° C. to give crude crystals. The crude crystals are recrystallized from hexane to give 3a,4,7,7a-tetrahydro-1-carboethoxy-4,7-methano-benzotriazole (63 parts by weight) as cubic crystals melting at 66 to 67° C.

(b) A solution of 3a,4,7,7a-tetrahydro-1-carboethoxy-4,7-methano-benzotriazole (50.9 parts by weight) in anhydrous methanol is warmed at 39 to 41° C. to lead to vigorous bubbling and decomposition. Warming is continued for about 2.5 hours and the methanol is evaporated. The residue is distilled at 80° C. to 82° C./4 mm. Hg to give 2,3-exo-carboethoxyimino-5-norbornene (26.4 parts by weight).

(c) A solution of 2,3-exo-carboethoxyimino-5-norbornene (5.0 parts by weight) and potassium hydroxide (2.35 parts by weight) in ethanol (200 parts by volume) is refluxed for 8 hours, and the resultant mixture is concentrated under reduced pressure. The residue is combined with water and the mixture is shaken with ether. The ethereal layer is dried over anhydrous potassium carbonate and the ether is evaporated. The residue is distilled at 120 to 130° C./2 mm. Hg (bath temperature) to give 2,3-exo-imino-5-norbornene (1.8 parts by weight). This substance is quite hygroscopic and decomposes in the atmosphere. Its oxalate, acetate and picrate readily decompose.

What is claimed is:

1. A compound selected from the group consisting of compounds of the formula:

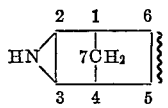

and the acid addition salts thereof, wherein the symbol } represents hydrogen atoms at the 5- and 6-positions, a double bond between the 5- and 6-positions or a condensed benzene ring between the 5- and 6-positions which is unsubstituted or substituted by at least one substituent selected from the group consisting of lower alkyl, lower alkoxy, halogen, amino, lower alkylamino, di(lower)alkylamino and cyano.

2. A compound according to claim 1 wherein the symbol } represents a condensed monosubstituted benzene ring wherein the substituent is selected from the group consisting of methyl, methoxy, chloro, amino, methylamino, dimethylamino and cyano.

3. A compound according to claim 1, said compound being the 2,3-exo-imino-benzo[5,6]-5-norbornene.

4. A compound according to claim 1, said compound being the 2,3-exo-imino-norbornane.

5. A compound according to claim 1, said compound being the 2,3-exo-imino-5-norbornene.

6. Process for preparing a norbornenylaziridine compound of the formula:

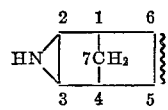

and the acid addition salts thereof, wherein the symbol } represents hydrogen atoms at the 5- and 6-positions, a double bond between the 5- and 6-positions or a condensed benzene ring between the 5- and 6-positions which is unsubstituted or substituted by at least one substituent selected from the group consisting of lower alkyl, lower alkoxy, halogen, amino, lower alkylamino, di(lower) alkylamino and cyano, which comprises subjecting a norbornenyl compound of the formula:

to addition of an azidoformate represented by the formula:

$$N_3\text{---COOR}$$

wherein R is a member selected from the group consisting of a lower alkyl, mononuclear carbocyclic aryl, and ar(lower)alkyl to yield a triazoline compound of the formula:

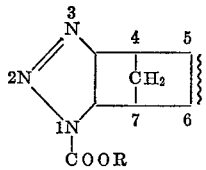

decomposing the triazoline compound by treatment with a lower alkanol at a temperature of from room temperature up to about 40° C. to yield an N-substituted aziridine compound of the formula:

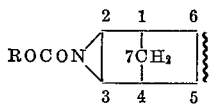

and eliminating the N-substituent from the N-substituted aziridine compound.

References Cited

UNITED STATES PATENTS 3,284,444   11/1966   Franz et al. _____ 260—239

OTHER REFERENCES

Wagner et al., Synthetic Organic Chemistry (New York, 1953), p. 678.

Weissberger, Heterocyclic Compounds, vol. 19, part once (New York, 1964), p. 539.

ALTON D. ROLLINS, *Primary Examiner.*

U.S. Cl. X.R.

260—308, 349, 465, 577, 578, 612, 650, 668, 999